(12) United States Patent
Trotta et al.

(10) Patent No.: US 9,987,614 B2
(45) Date of Patent: Jun. 5, 2018

(54) PROCESS FOR PREPARING A MICROPOROUS CARBON MATERIAL AND ITS USE AS ABSORPTION PRODUCT

(71) Applicant: ROQUETTE ITALIA S.P.A., Cassano Spinola (IT)

(72) Inventors: Francesco Trotta, Asti (IT); Fabrizio Caldera, Alice Castello (IT); Marco Zanetti, Chieri (IT); Anastasia Anceschi, Turin (IT); Giuliana Magnacca, Turin (IT)

(73) Assignee: Roquette Italia S.P.A., Cassano Spinola (IT)

( * ) Notice: Subject to any disclaimer, the term of this patent is extended or adjusted under 35 U.S.C. 154(b) by 0 days. days.

(21) Appl. No.: 15/029,501

(22) PCT Filed: Oct. 15, 2014

(86) PCT No.: PCT/EP2014/072142
§ 371 (c)(1),
(2) Date: Apr. 14, 2016

(87) PCT Pub. No.: WO2015/055729
PCT Pub. Date: Apr. 23, 2015

(65) Prior Publication Data
US 2016/0271580 A1    Sep. 22, 2016

(30) Foreign Application Priority Data
Oct. 15, 2013   (IT) .................. TO20130831

(51) Int. Cl.
| C01B 31/02 | (2006.01) |
| B01J 20/20 | (2006.01) |
| C08B 31/00 | (2006.01) |
| C08B 37/16 | (2006.01) |
| B01D 53/04 | (2006.01) |
| B01J 20/30 | (2006.01) |
| C02F 1/28 | (2006.01) |
| C01B 32/306 | (2017.01) |
| C02F 101/10 | (2006.01) |

(52) U.S. Cl.
CPC .......... B01J 20/20 (2013.01); B01D 53/04 (2013.01); B01J 20/3078 (2013.01); C01B 32/306 (2017.08); C02F 1/283 (2013.01); *C08B 31/003* (2013.01); *C08B 37/0012* (2013.01); *B01D 2253/102* (2013.01); *B01D 2257/504* (2013.01); *C02F 2101/103* (2013.01)

(58) Field of Classification Search
CPC ..................................... C01B 32/306
See application file for complete search history.

(56) References Cited

U.S. PATENT DOCUMENTS 5,726,118 A * 3/1998 Ivey ............... B01J 21/18
                                            502/180
6,329,316 B1 * 12/2001 Ogasa ............. B01J 20/20
                                            502/416

FOREIGN PATENT DOCUMENTS

EP       2471595 A1     7/2012
WO    2012/147069 A1    11/2012

OTHER PUBLICATIONS

International Search Report and Written Opinion for corresponding application PCT/EP2014/072142 (Jan. 15, 2015).
Ahmed et al., "Nanosponges—A Completely New Nano-Horizon: Pharmaceutical Applications and Recent Advances," Drug Dev. Indust. Pharm. 39(9):1263-1272 (2013).
Trotta et al., "Thermal Degradation of Cyclodextrins," Polymer Degradation and Stability 69(3):373-379 (2000).

\* cited by examiner

*Primary Examiner* — Stuart Hendrickson
(74) *Attorney, Agent, or Firm* — LeClairRyan PLLC

(57) ABSTRACT

The invention relates a process for preparing a microporous carbon material comprising the following steps: i) providing a cross-linked polymer obtainable by reacting either A1) a maltodextrin deriving from starch comprising amylose in the range from 25 to 50% expressed as dry weight relative to the dry weight of the starch or A2) a cyclodextrin with an organic aromatic dianhydride in a mass ratio of either maltodextrin or cyclodextrin with respect to the organic aromatic dianhydride in the range of 1:0.50 to 1:2, ii) pyrolyzing at a range from 700 to 900° C. with a heating ramp in the range from 5° C./min to 30° C./min in a inert gas flux; and iii) cooling the obtained residue. The microporous carbon material obtainable by the process of the invention consists of micropores having pore size distribution in the range from about 6 to about 16 Å and is used as absorber for liquids and gases.

19 Claims, 17 Drawing Sheets

PROCESS FOR PREPARING A MICROPOROUS CARBON MATERIAL AND ITS USE AS ABSORPTION PRODUCT

This application is a national stage application under 35 U.S.C. § 371 of PCT Application No. PCT/EP2014/072142, filed Oct. 15, 2014, which claims the priority benefit of Italy Application No. TO2013A000831, filed Oct. 15, 2013, which is hereby incorporated by reference in its entirety.

FIELD OF THE INVENTION

The present invention relates to a porous carbon material and its use as adsorption product.

BACKGROUND OF THE INVENTION

Porous activated carbon materials are promising products in the fields of catalysis and of the supercapacitors. They are also used in the adsorption and storage of the carbon dioxide and in the removal of pollutants such as arsenic from water.

Many porous materials based on carbon are known with different structures and morphologies and high surface areas. These materials are very convenient since they are cheap and show high thermal stability and high electrical conductivity.

There are three kinds of porous materials: 1) microporous materials having pores of diameter size less than 2 nm; 2) mesoporous materials having pores with diameter size in the range from 2 to 50 nm; 3) macroporous materials having pores with diameter size higher than 50 nm.

Such porous materials are generally produced by pyrolysis of biomasses such as mushrooms, corn, lignocellulose materials, fish scales and starch. These materials are promising as either supercapacitors or solid adsorbent materials for $CO_2$.

In view of the interest generated by these porous products, synthesis methods have been studied and used.

In literature (J. Lee, J. Kim, T. Hyeon, Recent progress in the synthesis of porous carbon materials, Adv. Mater., 2006, 2073-2094) the following synthesis methods are described: 1) chemical and physical activation and their combination; 2) catalytic activation of carbonious precursors by means of metal salts or organometals, 3) carbonization of an aerogel polymer in drying super-critical conditions; 4) carbonization of polymer mixtures of pyrolizable and carbonizable polymers; 5) biomass pyrolysis.

These synthesis techniques allow mesoporous materials to be obtained.

The microporous materials are obtained by means of templates (J. Lee, J. Kim, T. Hyeon, Recent progress in the synthesis of porous carbon materials, Adv. Mater., 2006, 2073-2094) or through biomass pyrolysis.

In M. M. Bruno, G. A. Planes, M. C. Miras, C. A. Barbero, E. P. Tejera, J. L. Rodriguez, Synthetic porous carbon as support of platinum nanoparticles for fuel cellelectrodes, Molecular Crystal and Liquid, 2010, a porous carbon material from resin pyrolysis is described. Specifically a solution of a cationic surfactant, formaldehyde, resorcinol, $Na_2CO_3$ and deionized water was prepared, stirred and heated until the Krafft temperature of surfactant has been reached. After heating for 24 hours at 70° C. (atmospheric pressure), a brown polymer was obtained. After drying, the polymer was carbonized at 800° C. BET specific surface area was about 500 $m^2/g$ in the tested temperature. Another porous material was obtained by pyrolysis of polysiloxanes: polymethyl (phenyl)siloxane was crosslinked at 250° C. for 4 hours in air. The collected powder was pyrolyzed at 1250-1450° C. under vacuum Subsequently, the pyrolyzed samples were leached by hydrofluoric acid (HF) solution (40 vol %) at room temperature for 1 h under stirring and rinsed off with distilled water to remove residue HF. It was then dried at 110° C. The leaching treatment was repeated for 5 times to prepare porous carbonaceous materials until there was no distinct weight loss. The porous material obtained showed pore diameter in the range of 2-3.2 nm in the tested temperature range and BET specific surface area in the range of 650-1150 $m^2/g$ in the tested temperature range (L. Duan, Q. Ma, Z. Chen, The production of high surface area porous carbonaceous materials from polysiloxane, NEW CARBON MATERIALS, 2013, 235-240).

K. T. Cho et al (K. T. Cho, S. B. Lee, J. W. Lee, Facile synthesis of electrocapacitive nitrogen-doped graphitic porous carbon, J. Phys. Che., 2014, 9357-9367) used as precursor polyacrylonitrile. This precursor was oxidized at a temperature of 290° C. for one hour through heating at a rate of 2° C./min. After thermal treatment, the mass was ground and mixed to KOH. The mixture was heated to 700-800° C. for 1 or 2 hours under argon flux. The porous carbon so obtained after washing with HCl and rinsing with deionized water was dried in stove under vacuum at 120° C. The porous material so obtained showed a pore size distribution between 0.5 and 5 nm with a surface area above 3000 $m^2/g$. Since the pore size distribution was between 5 and 50 Å, this material resulted to be both microporous and mesoporous.

Many porous carbon materials deriving from biomasses showed high performances in many applications such as in the absorption of $CO_2$ and in the removal of pollutants, for instance arsenic in the water.

Some porous materials were obtained by the hydrochar, i.e. from the hydrothermal carbonisation of *Salix psammophila*. The porours material so obtained is then activated under nitrogen through different temperatures for four hours at 4° C./min. After FTIR analysis the material resulted to have a condensate structure with BET SS Area of 300 $m^2/g$ and having micropores, mesopores and macropores.

Wang et al (H. C. Wang, B. L. LI, J. T. LI, X. B. Bian, J. Li, B. Zhang, Z. X. Wan, Direct synthesis of mesoporous from carbonization of hydroxypropyl-β-cyclodextrin/silica composite and its catalytic performance, Applied Surface Science, 2011, 4325-4330) used hydroxypropyl-β-cyclodextrin, which is a very expensive compound to synthesize a mesoporous material, by preparing a composite with silica. Specifically hydroxypropyl-β-cyclodextrin is dissolved in water and then added with tetrahydroxysilane (TEOS). The mass is then left for three days with continuous removal of ethanol and then heated at 100° C. for 12 hours. The final solid is then filtered and dried at 40° C. The material so obtained and consisting of HPCD/silica is then carbonised at 900° C. in nitrogen. After the carbonisation the material is treated with hydrofluoric acid in order to remove silica. Following to the thermal initial treatment BET SS areas between 500 and 1200 $m^2/g$ were obtained. The volume of the pores of the porous material were between 0.11 and 1.22 $cm^3/g$, the total volume of the micropores was between 0.022 and 0.239 $cm^3/g$.

A carbon porous material is valuable and finds easily applications if it shows a narrow diameter dispersion of the pores and if this feature is reproducible.

The carbon porous materials above described find application in many fields, specifically when they show reproducible and specific physical features such as constant sizes of the pores or the constant BET SS area.

The object of the present invention is hence to provide a carbon material having specific physical features.

SUMMARY OF THE INVENTION

In view of finding further carbon materials the inventors of the present invention surprisingly found out that the pyrolysis of specific polyhydroxy compounds allows a carbon microporous material to be obtained.

Specifically the invention relates to a process for preparing a microporous carbon material comprising the following steps:
i) providing a cross-linked polymer obtainable by reacting either A1) a maltodextrin deriving from starch comprising amylose in the range from 25 to 50% expressed as dry weight relative to the dry weight of the starch or A2) a cyclodextrin with an organic aromatic dianhydride in a mass ratio of either maltodextrin or cyclodextrin with respect to the organic aromatic dianhydride in the range of 1:0.50 to 1:2;
ii) pyrolyzing at a range from 700 to 900° C. with a heating ramp in the range from 5° C./min to 30° C./min in an inert gas flux; and
iii) cooling the obtained residue.

The microporous carbon material obtainable by the process of the invention consists of micropores having pore size distribution in the range from 6 to 16 Å.

In the present invention the ratio of either maltodextrin or cyclodextrin with respect to the organic aromatic dianhydride is expressed as mass ratio, but it can also expressed as molar ratio between the moles of the initial products. The ratio can also be expressed as ratio of the glucose unit condensed in the final cross-linked polymer. In this latter, the mass molar ratio of the unit of the glucose is intended as 162.145 g/mol. The mass ratio of either maltodextrin or cyclodextrin with respect to organic aromatic dianhydride is in the range of 1:0.50 to 1:2, preferably 1:0.60 to 1:1.

The organic aromatic dianhydride of step i) is preferably selected from the group consisting of pyromellitic dianhydride, NTCDA (1,4,5,8-naphthalene-tetracarboxylic dianhydride), 3',4,4'-biphenyltetracarboxylic dianhydride, benzophenone-3,3',4,4'-tetracarboxylic dianhydride, 4,4'-(hexafluoroisopropylidene)diphthalic anhydride. More preferably the organic aromatic dianhydride is pyromellitic dianhydride.

In a first advantageous embodiment of the invention the microporous carbon material is obtainable by a cross-linked polymer obtainable by reacting a maltodextrin deriving from starch comprising amylose in the range from 25 to 50% expressed as dry weight relative to the dry weight of the starch and the organic aromatic dianhydride in a mass ratio of the maltodextrin with respect to the organic aromatic dianhydride in the range of 1:0.50 to 1:2, preferably 1:0.60 to 1:1. More preferably the mass ratio is about 1:0.77. The final microporous material after step iii) consists of micropores having pore size distribution of about 7-12 Å.

The cyclodextrin of step i)A2) can be α-cyclodextrin, β-cyclodextrin, γ-cyclodextrin or their derivatives.

In a second advantageous embodiment of the invention the microporous carbon material is obtainable by a cross-linked polymer obtainable by reacting β-cyclodextrin and the organic aromatic dianhydride in a mass ratio of the β-cyclodextrin with respect to the organic aromatic dianhydride in the range of 1:0.50 to 1:2, preferably 1:0.60 to 1:1. More preferably the mass ratio is about 1:0.77. The molar ratio of the β-cyclodextrin with respect to the organic aromatic dianhydride is about 1:4. The final microporous material after step ii) and iii) consists of micropores having pore size distribution of about 6-16 Å.

In a third advantageous embodiment of the invention the microporous carbon material is obtainable by a cross-linked polymer obtainable by reacting α-cyclodextrin and the organic aromatic dianhydride in a mass ratio of the α-cyclodextrin with respect to the organic aromatic dianhydride in the range of 1:0.50 to 1:2, preferably 1:0.60 to 1:1. More preferably the mass ratio is about 1:0.90. The molar ratio of the α-cyclodextrin with respect to the organic aromatic dianhydride is about 1:4. The final microporous material after step ii) and iii) consists of micropores having pore size distribution of about 7-15 Å.

In a fourth advantageous embodiment of the invention the microporous carbon material is obtainable by a cross-linked polymer obtainable by reacting γ-cyclodextrin and the organic aromatic dianhydride in a mass ratio of the γ-cyclodextrin with respect to the organic aromatic dianhydride in the range of 1:0.50 to 1:2, preferably 1:0.60 to 1:1. More preferably the mass ratio is about 1:0.67. The molar ratio of the γ-cyclodextrin with respect to the organic aromatic dianhydride is about 1:4. The final microporous material after step ii) and iii) consists of micropores having pore size distribution of about 7-15 Å.

In all the embodiments of the invention in the step i) of the preparation of the cross-linked polymer a tertiary amine is preferably used as catalyst, more preferably triethylamine.

The microporous carbon material of the invention shows a high BET SS area. The microporous carbon material of the invention shows a high absorption of compound solution and gases. Therefore the microporous carbon material finds applications as drug delivery system showing optimal absorption of drug solution, and as absorber material of $CO_2$. Advantageously and as it will be evident from the experimental part of the present description the microporous carbon material is capable to absorb $CO_2$ in amounts higher than the active known carbon material.

DETAILED DESCRIPTION OF THE INVENTION

Figure 1:
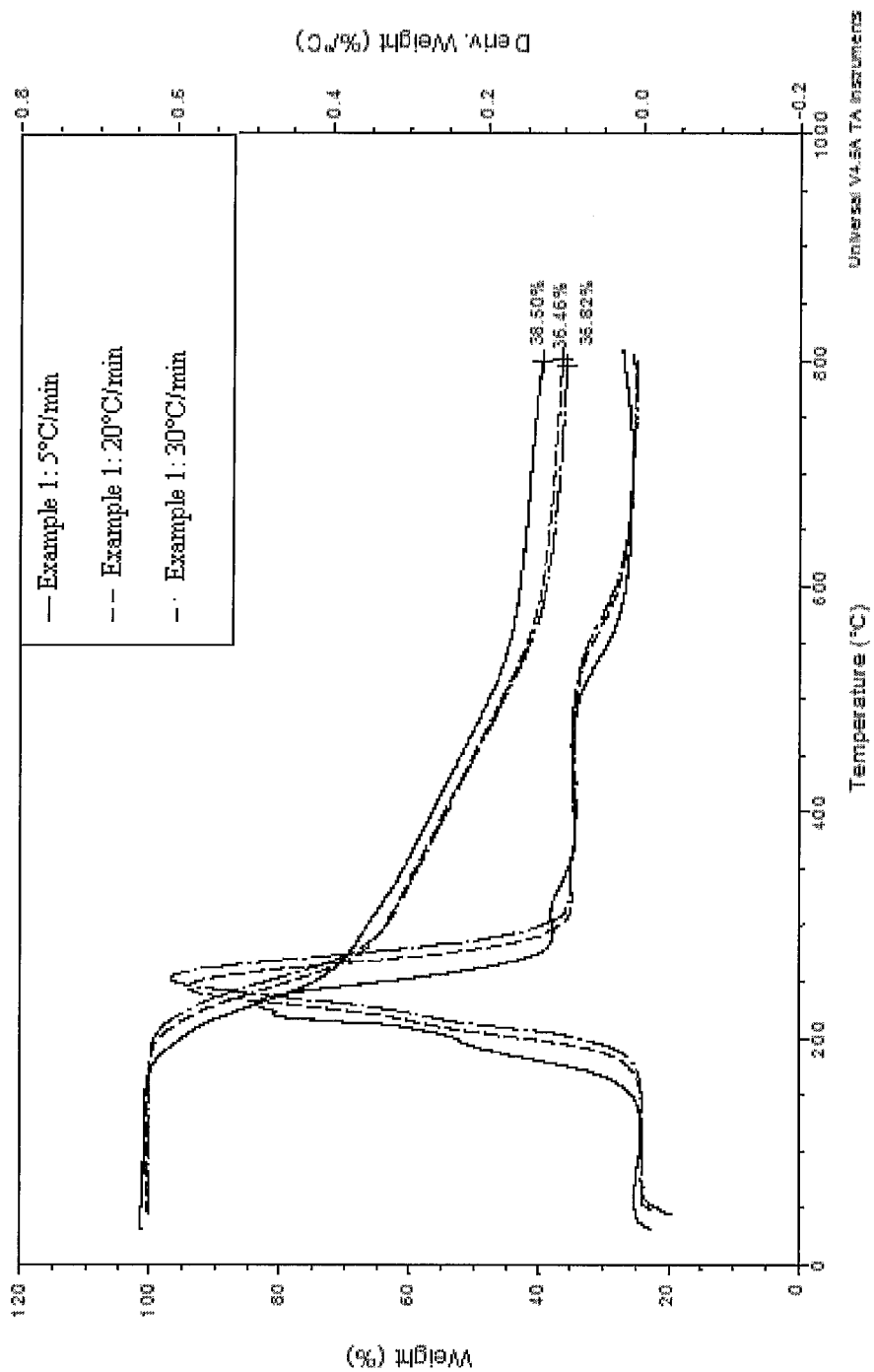
FIG. 1 shows the modification in weight percentage of carbon material of example 1 by varying the ramp temperature.

The invention relates to a process for preparing a microporous carbon material comprising the following steps:
i) providing a cross-linked polymer obtainable by reacting either A1) a maltodextrin deriving from starch comprising amylose in the range from 25 to 50% expressed as dry weight relative to the dry weight of the starch or A2) a cyclodextrin with an organic aromatic dianhydride in a mass ratio of either maltodextrin or cyclodextrin with respect to the organic aromatic dianhydride in the range of 1:0.50 to 1:2;
ii) pyrolyzing at a range from 700 to 900° C. with a heating ramp in the range from 5° C./min to 30° C./min in an inert gas flux; and
iii) cooling the obtained residue.

The mass ratio of either maltodextrin or cyclodextrin with respect to the organic aromatic dianhydride is in the range of 1:0.50 to 1:2, preferably 1:0.60 to 1:1.

The organic aromatic dianhydride of step i) is preferably selected from the group consisting of pyromellitic dianhydride, NTCDA (1,4,5,8-naphthalene-tetracarboxylic dianhydride), 3',4,4'-biphenyltetracarboxylic dianhydride, benzophenone-3,3',4,4'-tetracarboxylic dianhydride, 4,4'-(hexafluoroisopropylidene)diphthalic anhydride. More preferably the organic aromatic dianhydride is pyromellitic dianhydride.

According to a first embodiment of the invention the process comprises the step of providing a cross-linked polymer obtainable reacting A1) a maltodextrin deriving from starch comprising amylose in the range from 25 to 50% expressed as dry weight relative to the dry weight of the starch with the organic aromatic dianhydride in a mass ratio of the maltodextrin with respect to the organic aromatic dianhydride in the range of 1:0.50 to 1:2.

The maltodextrin A1) was firstly described in US2010/0196542 wherein the maltodextrin is obtained from a leguminous starch having an amylose content comprised between 25% and 50%, expressed as dry weight relative to the dry weight of starch. As explained in such a document, amylose is organized in helices with a hydrophilic external surface due to the presence of hydroxyl groups and with a hydrophobic internal surface due to the presence of hydrogen atoms. Preferably the maltodextrin of the invention derives from leguminous starch. By "leguminous" is meant within the meaning of the present invention any plant belonging to the families of the Caesalpiniaceae, Mimosaceae or Papilionaceae and notably any plant belonging to the family of the Papilionaceae such as, for example, pea, bean, broad bean, horse bean, lentil, lucerne, clover or lupin. This definition includes in particular all the plants described in any one of the tables contained in the article by R. HOOVER et al., 1991 (HOOVER R. (1991) "Composition, structure, functionality and chemical modification of leguminous starches: a review" Can. J. Physiol. Pharmacol., 69, pp.: 79-92). Preferably, the leguminous plant is chosen from the group formed by the pea, bean, broad bean, horse bean and their mixtures. According to a preferred and advantageous embodiment, the leguminous plant is a variety of pea or horse bean, producing seeds containing at least 25%, preferably at least 40%, by weight of starch (dry/dry). More advantageously, said leguminous plant is the pea. The term "pea" being here considered in its broadest sense and including in particular: all the wild "smooth pea" varieties and all the mutant "smooth pea" and "wrinkled pea" varieties, irrespective of the uses for which said varieties are generally intended (human consumption, animal nutrition and/or other uses).

The leguminous starch of the invention preferably has an amylose content comprised between 30% and 40%, in particular comprised between 35% and 40%, and more preferably between 35% and 38%, these percentages being expressed as dry weight relative to the dry weight of starch. The maltodextrins are conventionally obtained by acid and/or enzymatic hydrolysis of starch. Referring to the regulatory status, the maltodextrins have a dextrose equivalent (DE) of 1 to 20. Preferably in the present invention the maltodextrin has a dextrose equivalent (DE) of 17 and an average molecular weight by weight of about 12000 D.

The cross-linked polymer is hence obtainable from reacting the maltodextrin A1 with the organic aromatic dianhydride in a mass ratio in the range of 1:0.50 to 1:2, preferably 1:0.60 to 1:1. More preferably the mass ratio is about 1:0.77. The cross-linked polymer of A1) of step i) contains a number of helices with bridges deriving from the organic aromatic dianhydride. More preferably the organic aromatic dianhydride is pyromellitic dianhydride.

The cyclodextrin of step i)A2) can be α-cyclodextrin, β-cyclodextrin, γ-cyclodextrin or their derivatives. The derivative of the cyclodextrin can be methyl β-cyclodextrin or hydroxypropyl-β-cyclodextrin.

According to a second embodiment of the invention the process comprises the step of providing a cross-linked polymer obtainable reacting A2) β-cyclodextrin with the organic aromatic dianhydride in a mass ratio in the range of 1:0.50 to 1:2, preferably 1:0.60 to 1:1. More preferably the mass ratio is about 1:0.77. The molar ratio of the β-cyclodextrin with respect to the organic aromatic dianhydride is about 1:4.

The cross-linked polymer of the second embodiment obtainable by reacting A2) as β-cyclodextrin with the organic aromatic dianhydride is a polymer of units of β-cyclodextrin with cross-linking bridges of the organic aromatic dianhydride covalently linked to the units of β-cyclodextrin. More preferably the organic aromatic dianhydride is pyromellitic dianhydride.

According to a third embodiment of the invention the microporous carbon material is obtainable by a cross-linked polymer obtainable by reacting α-cyclodextrin and the organic aromatic dianhydride in a mass ratio of the α-cyclodextrin with respect to the organic aromatic dianhydride in a ratio in the range of 1:0.50 to 1:2, preferably 1:0.60 to 1:1. More preferably the mass ratio is about 1:0.90. The molar ratio of the α-cyclodextrin with respect to the organic aromatic dianhydride is about 1:4.

The cross-linked polymer of the third embodiment obtainable by reacting A2) as α-cyclodextrin with the organic aromatic dianhydride is a polymer of units of α-cyclodextrin with cross-linking bridges of the organic aromatic dianhydride covalently linked to the units of α-cyclodextrin. More preferably the organic aromatic dianhydride is pyromellitic dianhydride.

According to the fourth advantageous embodiment of the invention the microporous carbon material is obtainable by a cross-linked polymer obtainable by reacting γ-cyclodextrin and the organic aromatic dianhydride in a mass ratio of the γ-cyclodextrin with respect to the organic aromatic dianhydride in a ratio in the range of 1:0.50 to 1:2, preferably 1:0.60 to 1:1. More preferably the mass ratio is about 1:0.67. The molar ratio of the γ-cyclodextrin with respect to the organic aromatic dianhydride is about 1:4. The cross-linked polymer of the fourth embodiment obtainable by reacting A2) as γ-cyclodextrin with the organic aromatic dianhydride is a polymer of units of γ-cyclodextrin with cross-linking bridges of the organic aromatic dianhydride convalently covalently linked to the units of γ-cyclodextrin. More preferably the organic aromatic dianhydride is pyromellitic dianhydride.

In all the embodiments of the invention in the step i) of the preparation of the cross-linked polymer a tertiary amine is preferably used as catalyst, more preferably triethylamine.

Without being bound to any theory the inventors deem that the optimal constant physical features of the final microporous carbon material seemed to be guaranteed by the use of the organic aromatic dianhydride as cross-linking agent and by the specific mass ratio of either maltodextrin or cyclodextrin with respect to the organic aromatic dianhydride in the range of 1.50 to 1:2, preferably 1:60 to 1:1, to achieve the cross-linked polymer between either A1) or A2) and the organic aromatic dianhydride.

In step ii) the cross-linked polymer of step i) is subjected to pyrolysis in the range of 700-900° C. with a ramp in the range from 5° C./min to 30° C./min in an inert gas flux. Preferably, the inert gas flux is of about 100 ml/min, more preferably the inert gas flux is a nitrogen flux. Preferably the ramp is 10° C./min, more preferably in a nitrogen flux. Preferably the temperature of the pyrolysis is 800° C.

In step iii) the carbon mass obtained by step ii) is cooled preferably through inert gas flux in order to avoid any oxidation reaction, more preferably until the samples are below 200° C.

The microporous carbon material of the invention consists of micropores having pore size distribution in the range from about 6 to about 16 Å.

In the present invention the pore size distributions were characterized by nitrogen adsorption-desorption isotherms obtained with an automatic adsorption instrument (ASAP 2020). This instrument allows the characterization of surface area and pore structure. The basics of the analytical technique is as follows. The sample is degased at 300° C. and then a sample contained in an evacuated sample tube is cooled to nitrogen cryogenic temperature, then it is exposed to nitrogen gas at a series of precisely controlled pressures (from 0 to 1 of nitrogen relative pression). With each incremental pressure increase, the number of gas molecules adsorbed on the surface increases. The pressure at which adsorption equilibrium occurs is measured and the universal gas law is applied to determine the quantity of gas adsorbed. As adsorption proceeds, the thickness of the adsorbed film increases. Any micropores in the surface are quickly filled, then the free surface becomes completely covered, and finally larger pores are filled. The process may continue to the point of bulk condensation of the analysis gas. Then, the desorption process may begin in which pressure systematically is reduced resulting in liberation of the adsorbed molecules.

As with the adsorption process, the changing quantity of gas on the solid surface is quantified. These two sets of data describe the adsorption and desorption isotherms. Analysis of the isotherms yields information about the surface characteristics of the material.

The models used for the surface area was the Langmuir model. The volume and the pore distribution was determined with DFT model.

The microporous carbon material of the first embodiment of the invention, i.e. obtainable by the cross-linked polymer of A1) has pore size distribution in the range from about 7 to about 12 Å

The microporous carbon material of the second embodiment of the invention, i.e. obtainable by the cross-linked polymer of A2), wherein the cyclodextrin is β-cyclodextrin has pore size distribution in the range from about 6 to about 16 Å.

The microporous carbon material of the third embodiment of the invention, i.e. obtainable by the cross-linked polymer of A2) wherein the cyclodextrin is α-cyclodextrin, has pore size distribution in the range from about 7 to about 15 Å.

The microporous carbon material of the fourth embodiment of the invention, i.e. obtainable by the cross-linked polymer of A2), wherein the cyclodextrin is γ-cyclodextrin has pore size distribution in the range from about 7 to about 15 Å.

The microporous carbon material of the invention shows a high BET SS area.

The microporous carbon material of the invention shows a high absorption of compound solution and gases. Therefore the microporous carbon material finds applications as drug delivery system showing optimal absorption of drug solution, and as absorber material of $CO_2$. Advantageously and as it will be evident from the experimental part of the present description the microporous carbon material is capable to absorb $CO_2$ in amounts higher than the active known carbon material.

The invention will be now described with reference to examples of preparation of the polymer of the invention and examples of absorption.

EXPERIMENTAL PART

Example 1: Preparation of Microporous Carbon Material According to the First Embodiment of the Invention Step i) Preparation of the cross-linked polymer by reacting A1) a maltodextrin deriving from starch comprising amylose in the range from 25 to 50% expressed as dry weight relative to the dry weight of the starch and pyromellitic dianhydride as cross-linking agent.

4.89 g of maltodextrin sold as Kleptose Linecaps 17 from Roquette Italia SpA, having DE of 17 (dried in stove at 100-120° C. for at least one night) were solubilized under continued stirring in 20 ml of dimethyl sulfoxide in a 100 ml flask. 5 ml of triethylamine were then added and, after a few minutes, 3.76 g of pyromellitic dianhydride were added. The mass ratio of the maltodextrin with respect to pyromellitic dianhydride was 1:0.77. The molar ratio between the initial maltodextrin and pyromellitic dianhydride was 1:0.57 expressed as molar ratio of one mole of glucose of the maltodextrin with respect to 0.57 moles of pyromellitic dianhydride (Molar mass of the glucose unit of 162.145 g/ml). After a short time, the reticulation process blocked the stir bar. After 24 hours the reaction was considered complete. In the following days, the polymer was ground in a mortar and washed with deionized water in a Buchner funnel with water jet pump. After the air drying, the polymer was purified in a Soxhlet extractor with acetone for a total time of about 14 hours.

Step ii) and iii) Pyrolysis of the Cross-Linked Polymer and Consequent Cooling

The cross-linked polymer so obtained was subjected to pyrolysis in a "single step". The cross-linked polymer was heated to 800° C. with a temperature ramp of 10° C./min in nitrogen flux (100 ml/min). Specifically, 15 mg of the cross-linked polymer obtained by step I) were placed in a alumina plate for TGA and then placed in a furnace under nitrogen flux at 30° C. and subjected to a planned heating of 10° C. per min until reaching 800° C. The mass so obtained was then cooled and the carbon material was recovered. 5.25 mg of carbon material were obtained (yield 35%). The pyrolysis process was followed with TGA analysis.

Example 2: Preparation of Microporous Carbon Material According to the Second Embodiment of the Invention Step i) 4 ml of dimethyl sulfoxide (DMSO) and 0.9772 g of β-cyclodextrin are added in a glass vial under stirring until they were solubilized. 1 ml of triethylamine as catalyst was then added.

After a few minutes 0.7512 g of pyromellitic dianhydride were added. The mass ratio of the β-cyclodextrin with respect to pyromellitic dianhydride was 1:0.77. The molar ratio between the initial β-cyclodextrin and pyromellitic dianhydride was 1:4. After 24 hours the reaction was considered complete and the mass was washed with deionized water in a Buchner funnel and then with acetone, thus allowing to dry for a day.

The next step was the purification of Soxhlet funnel with acetone. The extraction lasted 20 hours. The cross-linked polymer so obtained was allowed to dry.

Step ii) and iii) Pyrolysis of the Cross-Linked Polymer and Consequent Cooling

The cross-linked polymer so obtained was subjected to pyrolysis in a "single step". The cross-linked polymer was heated to 800° C. with a temperature ramp of 10° C./min in nitrogen flux (60 ml/min). Specifically, 15 mg of the cross-linked polymer obtained by step i) were placed in a alumina plate for TGA and then placed in a furnace under nitrogen flux at 30° C. and subjected to a planned heating of 10° C. per min until reaching 800° C. The mass so obtained was then cooled and the carbon material was recovered. 4.35 mg of carbon material were obtained (yield 29%). The pyrolysis process was followed with TGA analysis.

Example 3: Preparation of Microporous Carbon Material According to the Third Embodiment of the Invention Step i) 20 ml of dimethyl sulfoxide (DMSO) and 4.8860 g of α-cyclodextrin are added in a glass vial under stirring until they were solubilized. 5 ml of triethylamine as catalyst was then added.

After a few minutes 4.3820 g of pyromellitic dianhydride were added. The mass ratio of the α-cyclodextrin with respect to pyromellitic dianhydride was 1:0.90. The molar ratio between the initial maltodextrin and pyromellitic dianhydride was 1:4. After 24 hours the reaction was considered complete and the mass was washed with deionized water in a Buchner funnel and then with acetone, thus allowing to dry for a day.

The next step was the purification of Soxhlet funnel with acetone. The extraction lasted 14 hours. The cross-linked polymer so obtained was allowed to dry.

Step ii) and iii) Pyrolysis of the Cross-Linked Polymer and Consequent Cooling

The cross-linked polymer so obtained was subjected to pyrolysis in a "single step". The cross-linked polymer was heated to 800° C. with a temperature ramp of 10° C./min in nitrogen flux (100 ml/min). Specifically, 15 mg of the cross-linked polymer obtained by step i) were placed in a alumina plate for TGA and then placed in a furnace under nitrogen flux at 30° C. and subjected to a planned heating of 10° C. per min until reaching 800° C. The mass so obtained was then cooled and the carbon material was recovered. 4.2 mg of carbon material were obtained (yield 28%). The pyrolysis process was followed with TGA analysis.

Example 4: Preparation of Microporous Carbon Material According to the Fourth Embodiment of the Invention. (gamma)

Step i) 20 ml of dimethyl sulfoxide (DMSO) and 4.8860 g of γ-cyclodextrin are added in a glass vial under stirring until they were solubilized. 5 ml of triethylamine as catalyst was then added.

After a few minutes 3.2865 g of pyromellitic dianhydride were added. The mass ratio of the γ-cyclodextrin with respect to pyromellitic dianhydride was 1:0.67. The molar ratio between the initial maltodextrin and pyromellitic dianhydride was 1:4. After 24 hours the reaction was considered complete and the mass was washed with deionized water in a Buchner funnel and then with acetone, thus allowing to dry for a day.

The next step was the purification of Soxhlet funnel with acetone. The extraction lasted 14 hours. The cross-linked polymer so obtained was allowed to dry.

Step ii) and iii) Pyrolysis of the Cross-Linked Polymer and Consequent Cooling

The cross-linked polymer so obtained was subjected to pyrolysis in a "single step". The cross-linked polymer was heated to 800° C. with a temperature ramp of 10° C./min in nitrogen flux (100 ml/min). Specifically, 15 mg of the cross-linked polymer obtained by step i) were placed in a alumina plate for TGA and then placed in a furnace under nitrogen flux at 30° C. and subjected to a planned heating of 10° C. per min until reaching 800° C. The mass so obtained was then cooled and the carbon material was recovered. 4.43 mg of carbon material were obtained (yield 29.5%). The pyrolysis process was followed with TGA analysis.

Example 5: Effect of Ramp Temperature on the Final Carbon Materials

The same ingredients and the same procedures as stated in example 1 for the first embodiment of the invention and in the example 2 for the second embodiment of the invention were repeated using a different ramp of temperatures, i.e. 5° C./min, 20° C./min and 30° C./min during step ii).

Figure 2:
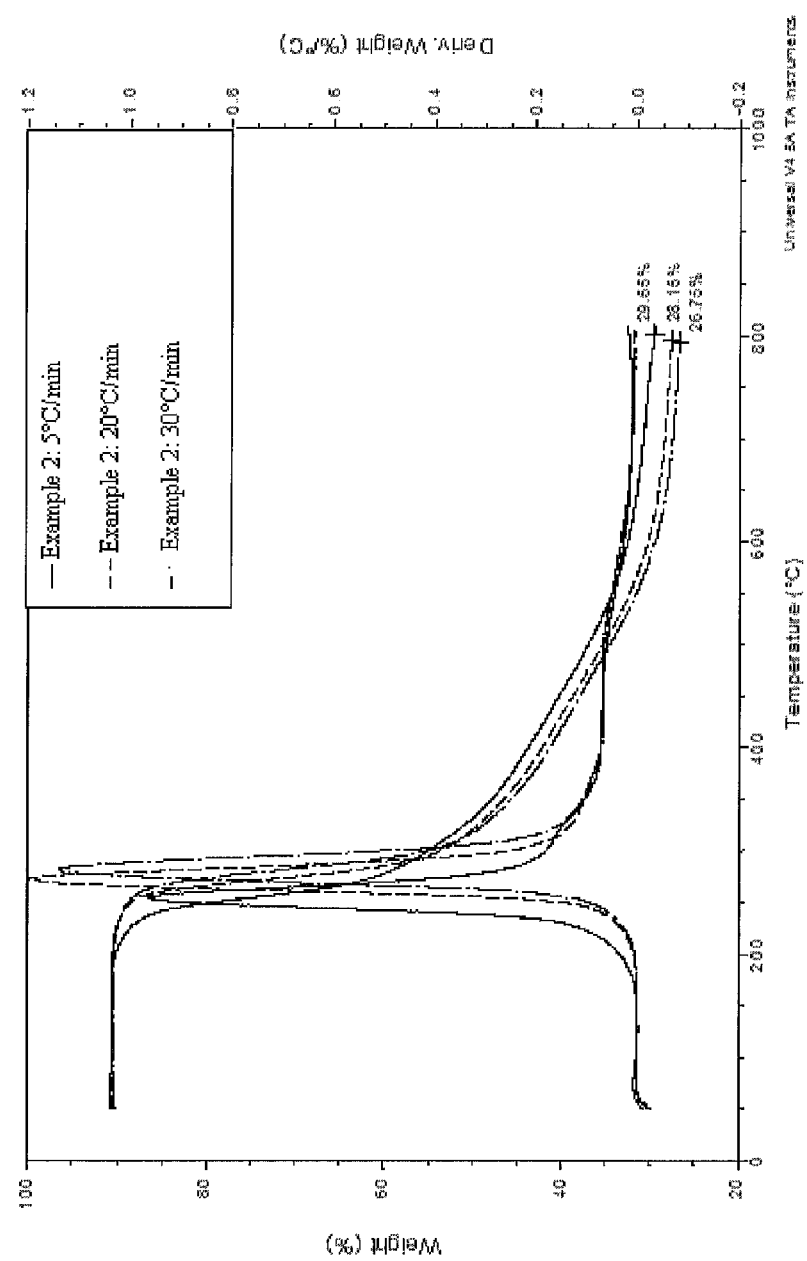
FIG. 2 shows the modification in weight percentage of carbon material of example 2 by varying the ramp temperature.

The results are shown in FIG. 1 and in FIG. 2, respectively.

As it is evident from FIGS. 1 and 2 both the crosslinked polymers do not show modifications in the amount of carbon residue by varying the ramp of temperature.

Example 6: Effect of Pyrolysis on the Final Carbon Materials

The same ingredients and the same procedures as stated in example 1 for the first embodiment of the invention and in the example 2 for the second embodiment of the invention were repeated using 700, 800° C. and 900° C. as pyrolysis temperature of step ii). The results are shown in FIG. 3 and in FIG. 4, respectively.

Figure 3:
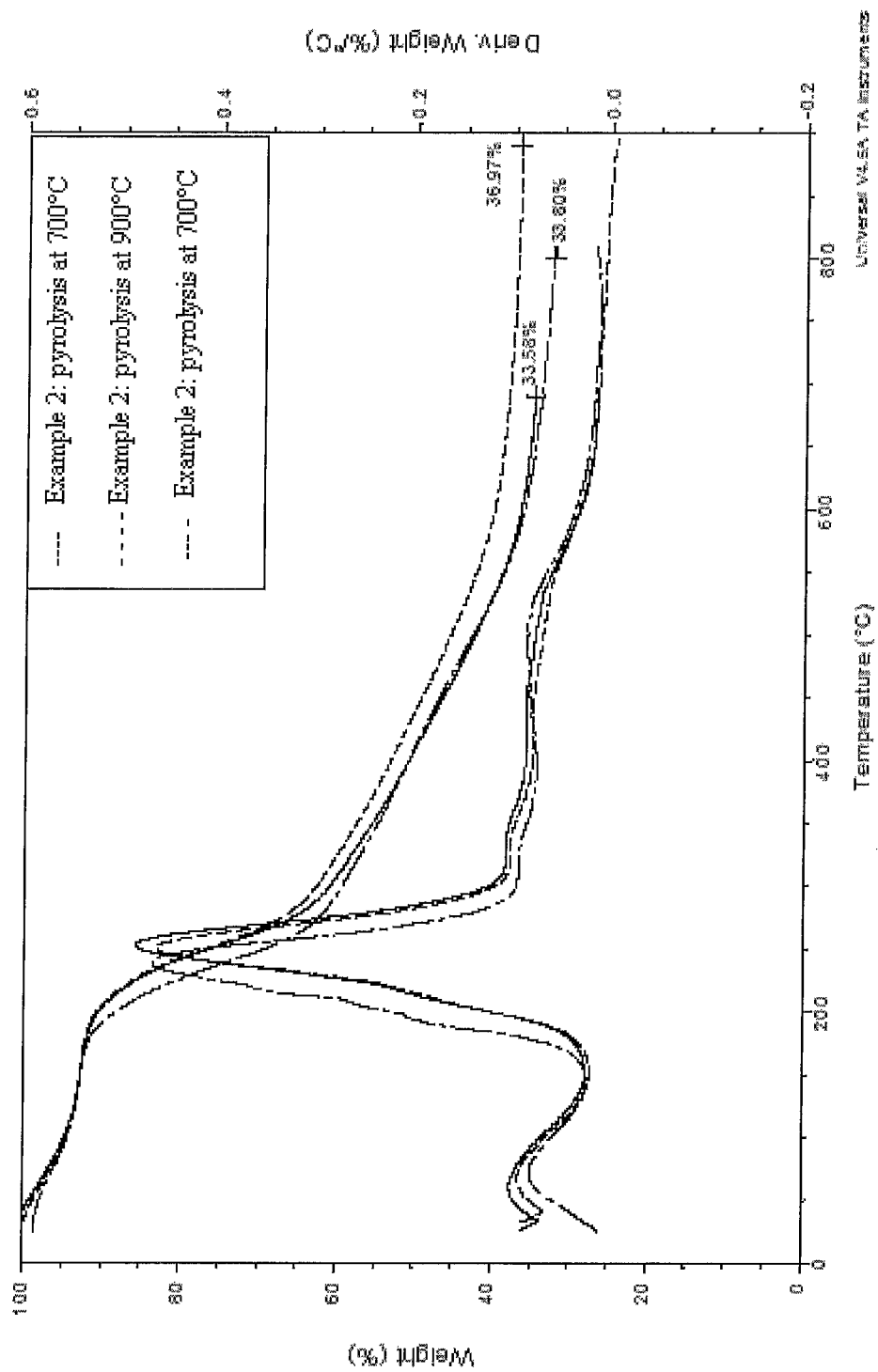
FIG. 3 shows the modification in weight percentage of carbon material of example 1 by varying the pyrolysis temperature.
Figure 4:
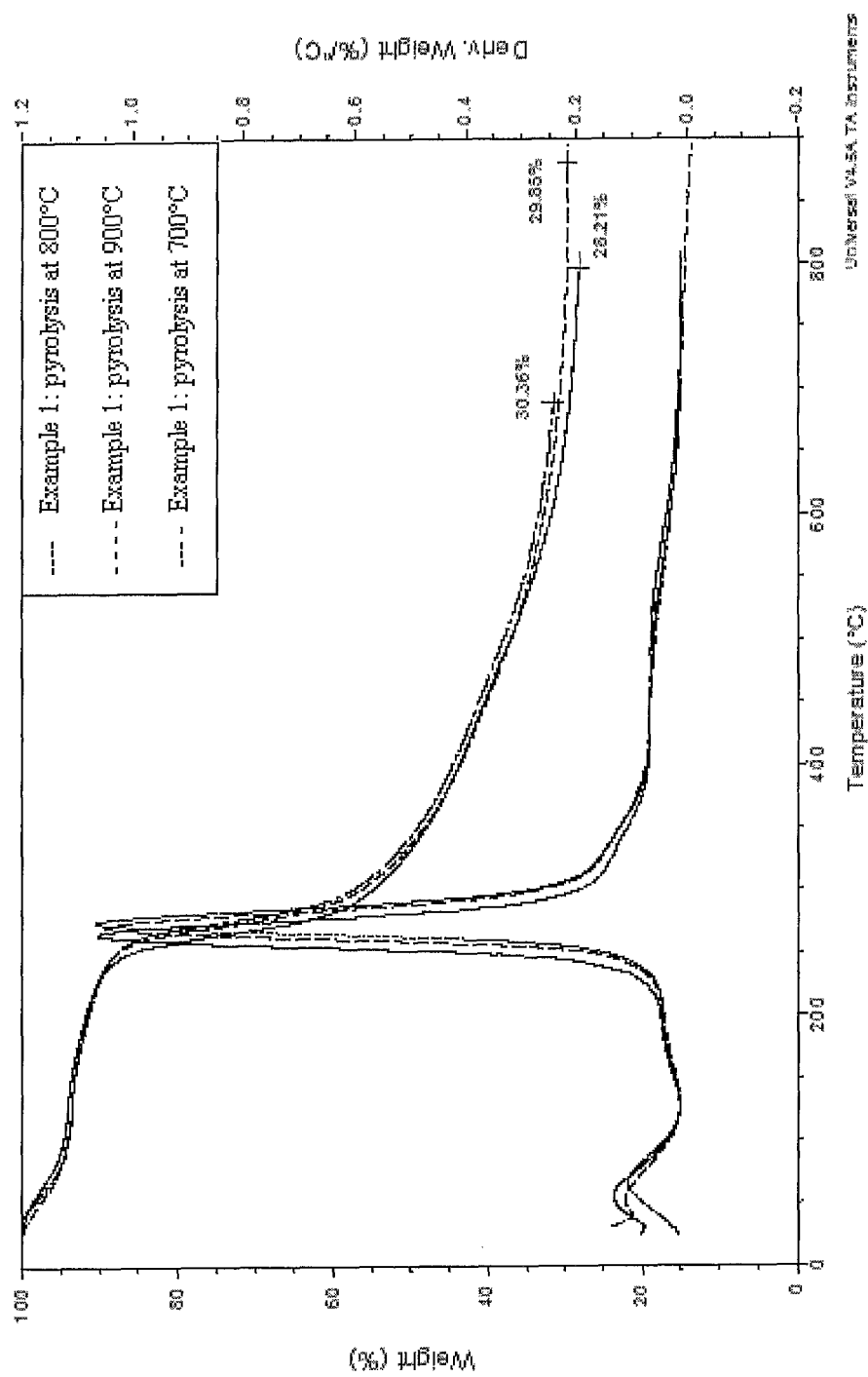
FIG. 4 shows the modification in weight percentage of carbon material of example 2 by varying the pyrolysis temperature.
Figure 5A:
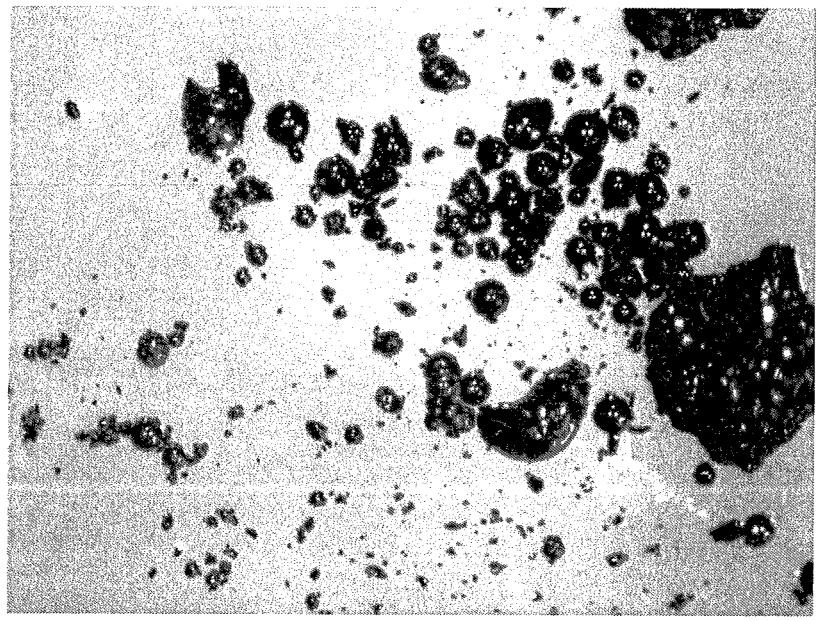
FIGS. 5a and 5b show pictures of optical microscope and SEM microscope (magnification 200×) of the carbon materials of example 1.
Figure 5B:
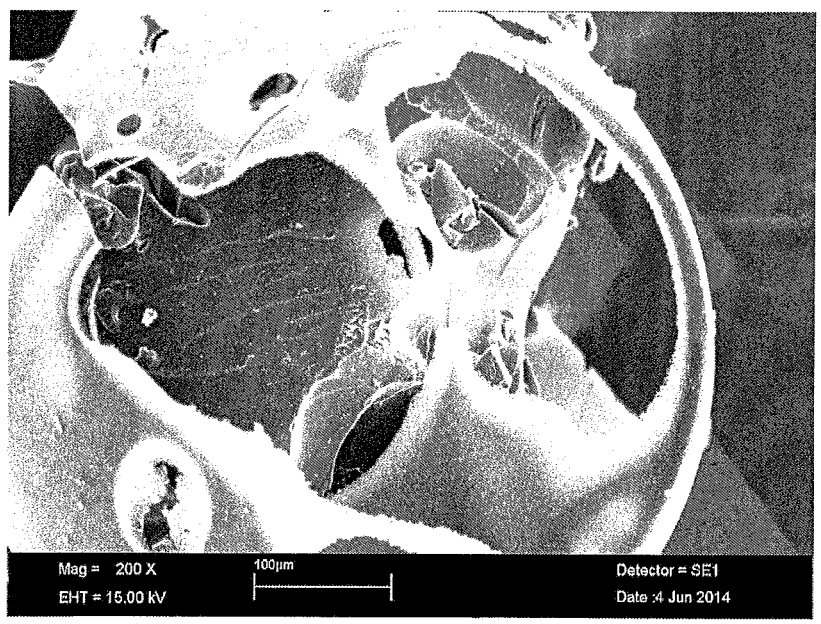
Figure 5C:
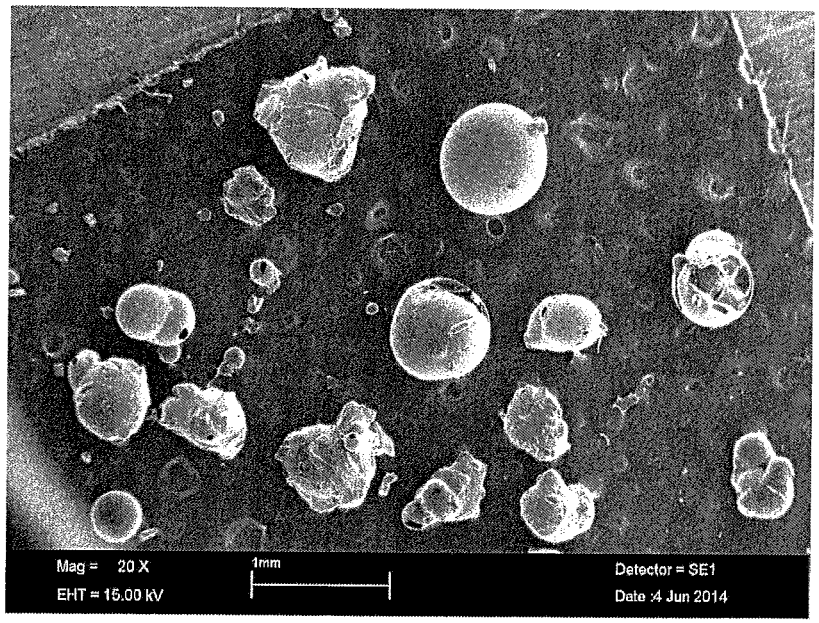
FIG. 5c shows pictures of SEM microscope of the carbon material of example 1 at magnification of 20×.
Figure 5D:
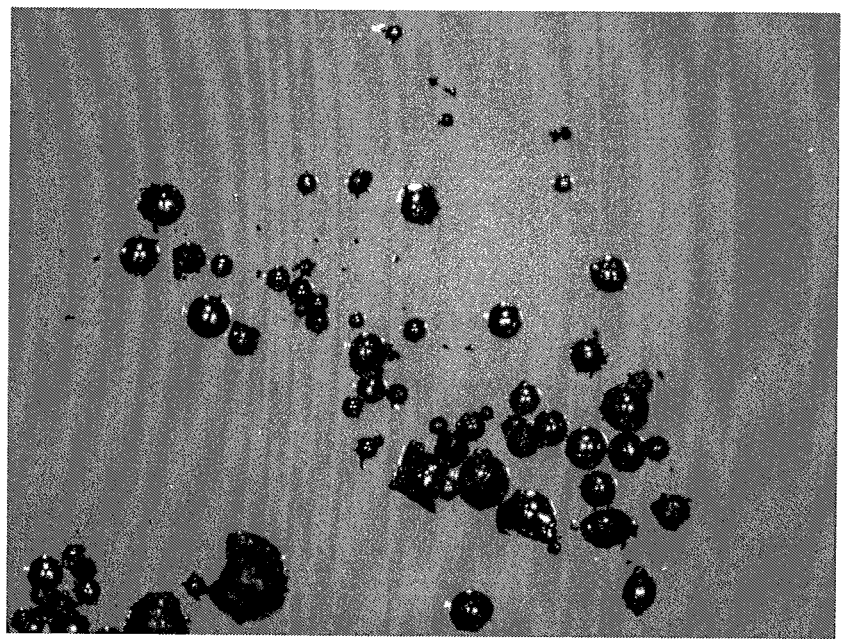
FIG. 5d shows picture of optical microscope of the carbon material of example 2.
Figure 5E:
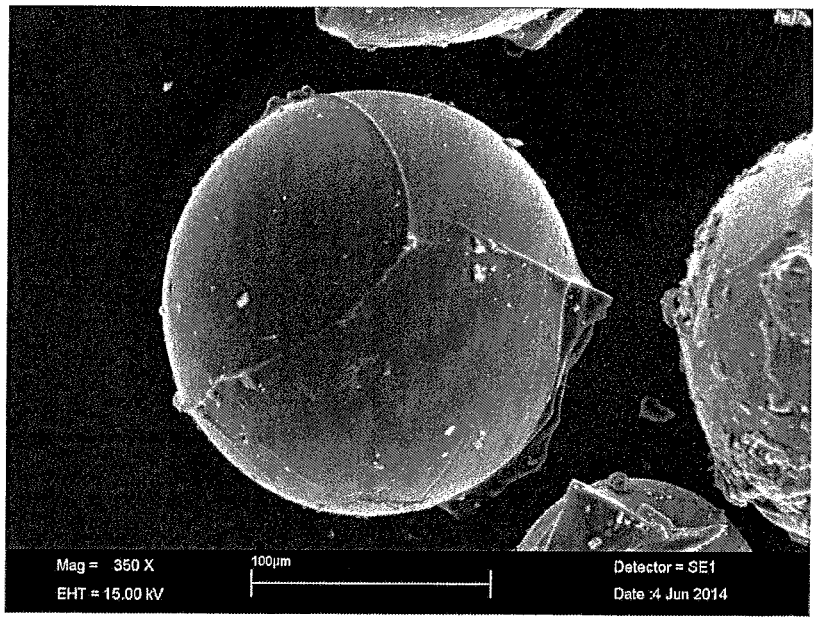
FIGS. 5e and 5f show pictures of SEM microscope of the carbon material of example 2 at magnification of 350× and 500×, respectively.
Figure 5F:
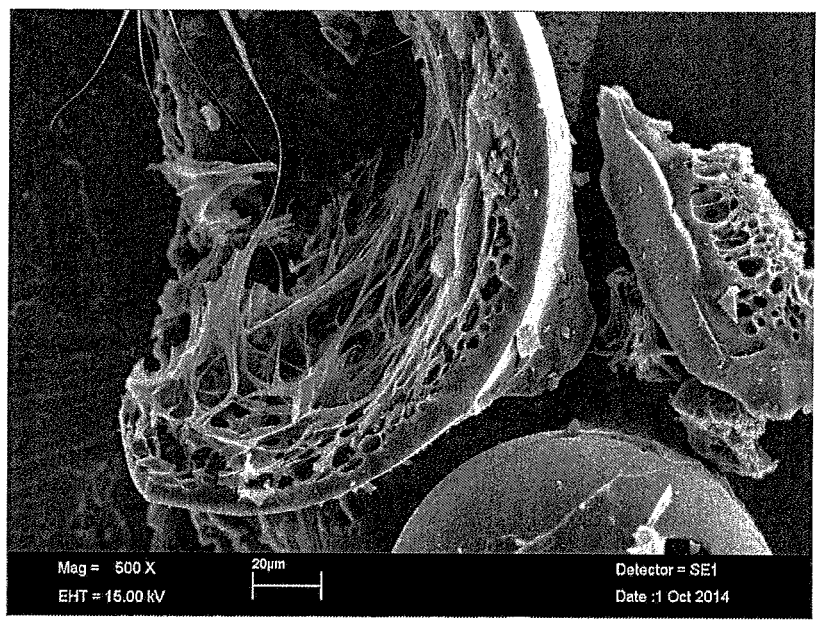

As it is evident form the FIGS. 3 and 4, both the crosslinked polymers do not show losses of weight when 900° C. was reached and the amount of carbon material at 700° C. and 800° C. was very similar.

From FIGS. 3-4 hence it was evident that the pyrolysis could occur at a temperature in the range 700-900° C.

Example 7: Analysis of the Carbon Materials Obtained by Example 1 and Example 2

The elemental analysis of the cross-linked polymer with A1) of example 1 was: 2.755% of nitrogen, 50.204% of carbon, 6.328% of hydrogen and 0.00% of Sulfur, being the oxygen percentage the remaining to 100%.

The elemental analysis of cross-linked polymer with A2) of example 2 (with β-cyclodextrin) was: 3.089% of nitrogen, 48.941% of Carbon, 6.178% of hydrogen and 0.00% of Sulfur, being the oxygen percentage the remaining to 100%.

The elemental analysis of cross-linked polymer with A1) of example 1 after pyrolysis at 800° C. shows: 1.41% of nitrogen, 60.24% of carbon, 0.94% of hydrogen and 0.00% of Sulfur, being the oxygen percentage the remaining to 100%.

The elemental analysis of cross-linked polymer with A2) of example 2 (with β-cyclodextrin) after pyrolysis at 800° C. was 1.546% of nitrogen, 87.270% of carbon, 0.732% of hydrogen and 0.00% of Sulfur, being the oxygen percentage the remaining to 100%.

The carbon materials obtained in examples 1 and 2 were analyzed with optical microscope and through scanning electron microscope (SEM). The pictures are shown in FIGS. 5a-5f. The carbon material obtained had spherical shapes.

The carbon materials were further analyzed in order to determine the size of the pores and the surface area.

Specifically, the carbon material prepared according to example 1 and example 2 showed mono-dimensional micropores.

Figure 6:
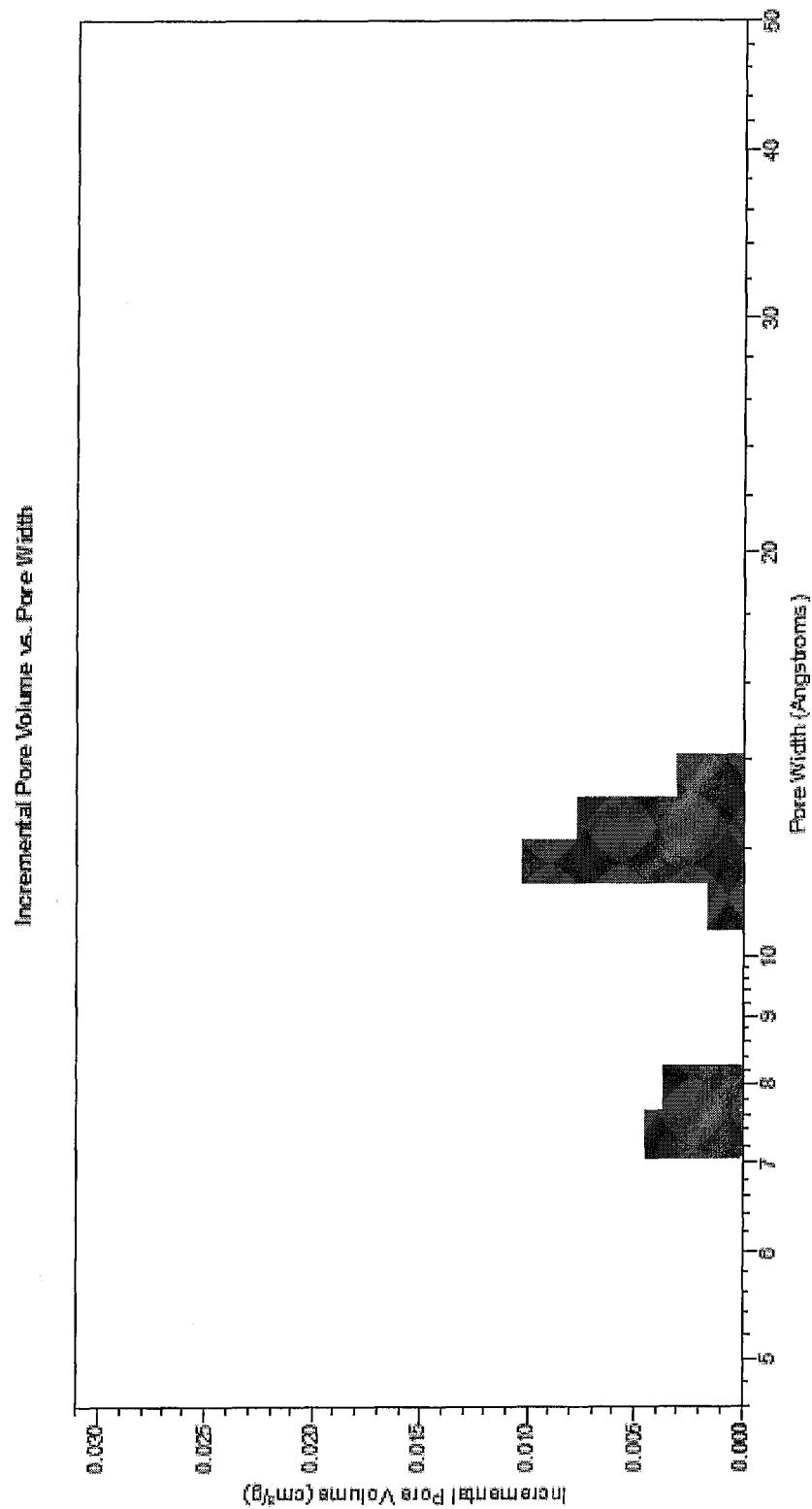
FIG. 6 shows plot of incremental pore volume vs pore width of the porous carbon material of example 1.

As stated above the pore size distributions were characterized by nitrogen adsorption-desorption isotherms obtained with an automatic adsorption instrument (ASAP 2020). The details for the instrument and the technique are above reported. As above indicated the models used for the surface area is the Langmuir model. The volume and the pore distribution is determined with DFT model The results for the microporous carbon material according to example 1 are represented in FIG. 6. As it is evident the pore size distribution of the micropores of the carbon material according to the first embodiment of the invention fall in the range of 7-8 Å and in the range of 10-12 Å.

Figure 7:
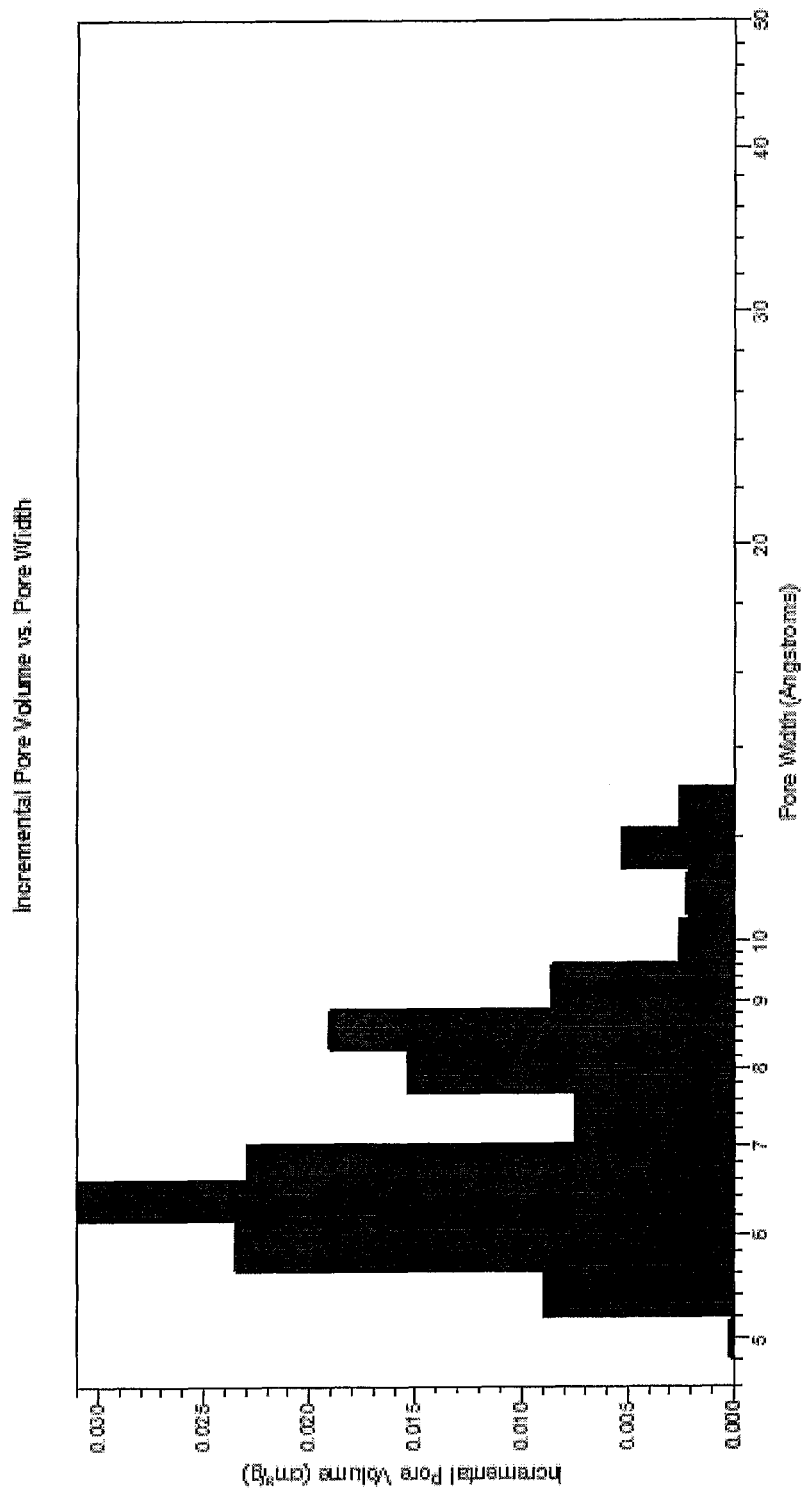
FIG. 7 shows plot of incremental pore volume vs pore width of the porous carbon material of example 2.

The results for the microporous carbon material according to example 1 are represented in FIG. 7. As it is evident the pore size distribution of the micropores of the carbon material according to the first embodiment of the invention fall in the range of 6-16 Å.

The porous carbon materials obtained according to the invention were then classified as "microporous" material according to the IUPAC definition.

The carbon materials according to example 1 and example 2 were also tested to calculate the BET SS area with the same instrument used for the measurement of the pore size distribution as above explained and the results are reported in the table 1 below.

Example 8: Analysis of the Carbon Materials Obtained by Example 3 and Example 4

The carbon materials obtained in examples 3 and 4 were analyzed with optical microscope and through scanning electron microscope (SEM). The carbon material obtained had spherical shapes.

The carbon materials were further analyzed in order to determine the size of the pores and the surface area.

Specifically, the carbon material prepared according to example 3 and example 4 showed mono-dimensional micropores As stated above the pore size distributions were characterized by nitrogen adsorption-desorption isotherms obtained with an automatic adsorption instrument (ASAP 2020). The details for the instrument and the technique are above reported.

As above indicated the models used for the surface area is the Langmuir model. The volume and the pore distribution is determined with DFT model.

Figure 14:
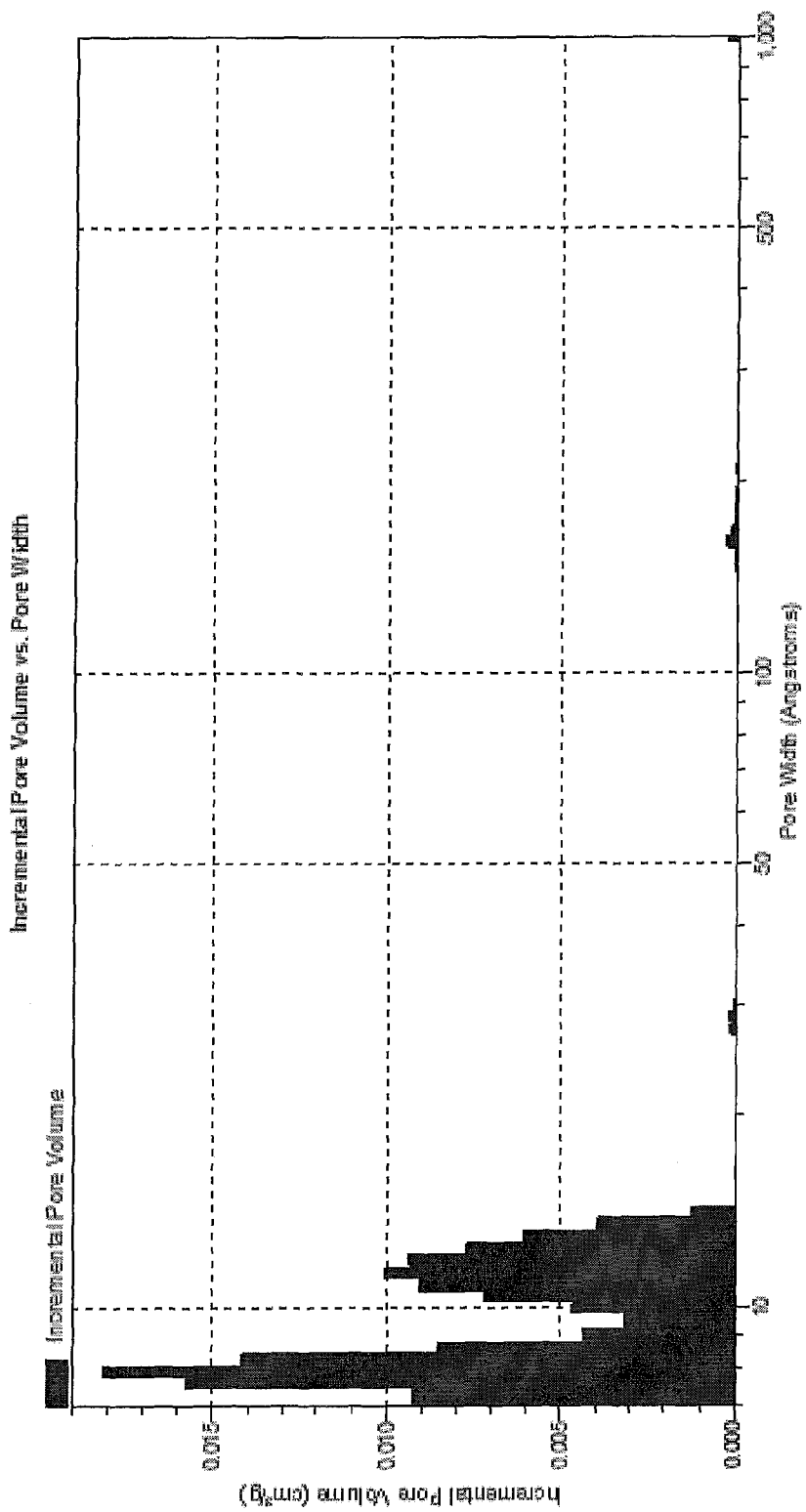
FIG. 14 shows plot of incremental pore volume vs pore width of the porous carbon material of example 3.

The results for the microporous carbon material according to example 3 are represented in FIG. 14. As it is evident the pore size distribution of the micropores of the carbon material according to the third embodiment of the invention fall in the range of 7-15 Å.

Figure 15:
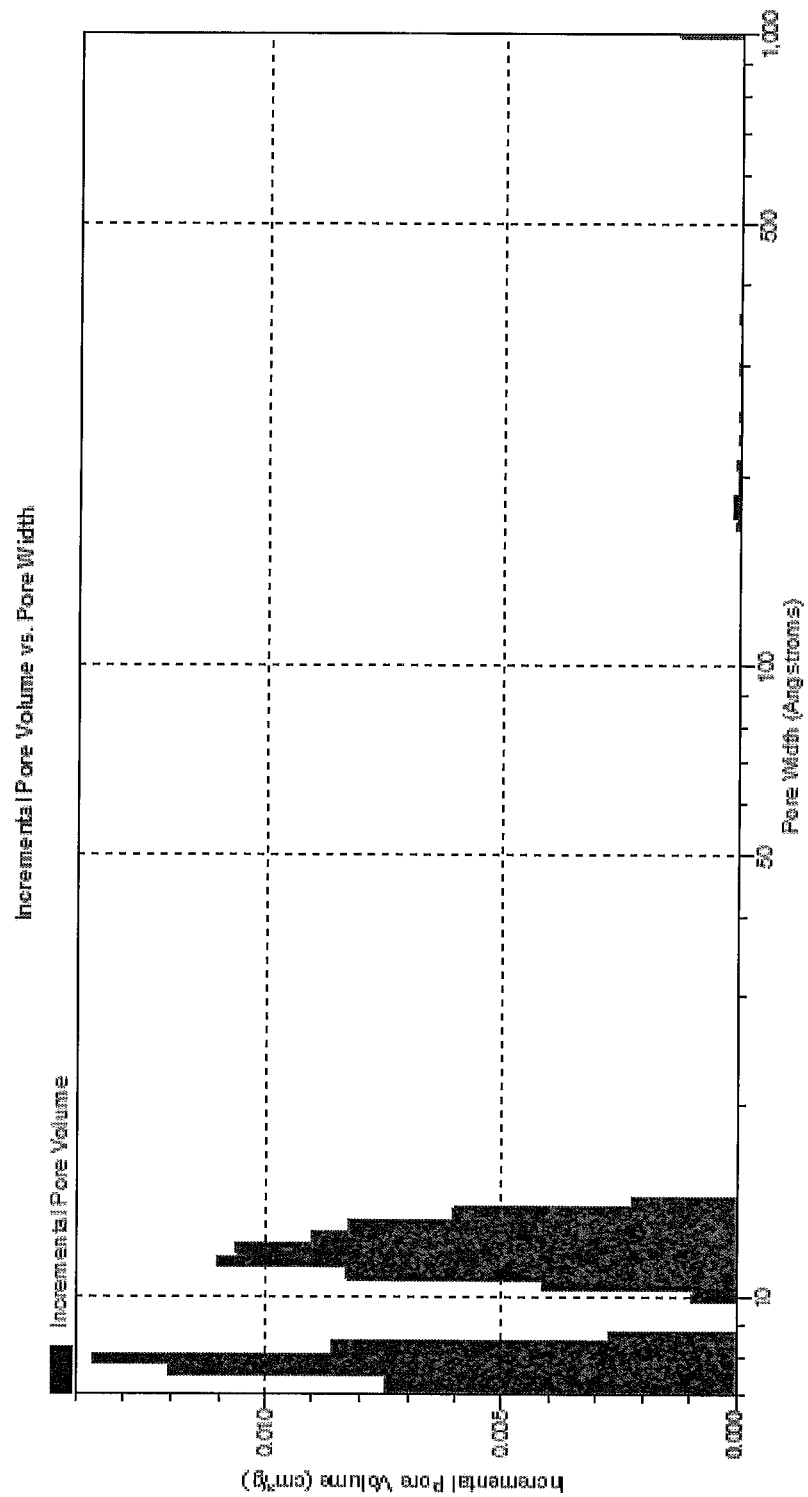
FIG. 15 shows plot of incremental pore volume vs pore width of the porous carbon material of example 4.

The results for the microporous carbon material according to example 4 are represented in FIG. 15. As it is evident the pore size distribution of the micropores of the carbon material according to the first embodiment of the invention fall in the range of 7-15 Å.

The porous carbon materials obtained according to the invention were then classified as "microporous" material according to the IUPAC definition.

The carbon materials according to example 3 and example 4 were also tested to calculate the BET SS area with the same instrument used for the measurement of the pore size distribution as above explained and the results are reported in the table 1 below.

TABLE 1

| Sample | Surface Area (m$^2$/g) | Pore size distribution (Å) |
|---|---|---|
| Carbon Material of example 1 (I batch of synthesis) | 234 | 6-16 |
| Carbon Material of example 1 (II batch of synthesis) | 560 | 8-15 |
| Carbon Material of example 2 (I batch of synthesis) | 188 | 7-8 10-12 |
| Carbon Material of example 2 (II batch of synthesis) | 124 | 7-8 10-15 |
| Carbon Material of | 424 | 7-8 10-15 |

TABLE 1-continued

| Sample | Surface Area (m²/g) | Pore size distribution (Å) |
|---|---|---|
| example 3 Carbon Material of example 4 | 350 | 7-8 10-15 |

Example 9: Absorption Feature

The absorption feature of the carbon materials obtained according to example 2 was verified with 10 ppm methyl orange solution.

The absorption was evaluated with UV Spectra at different times.

Figure 8:
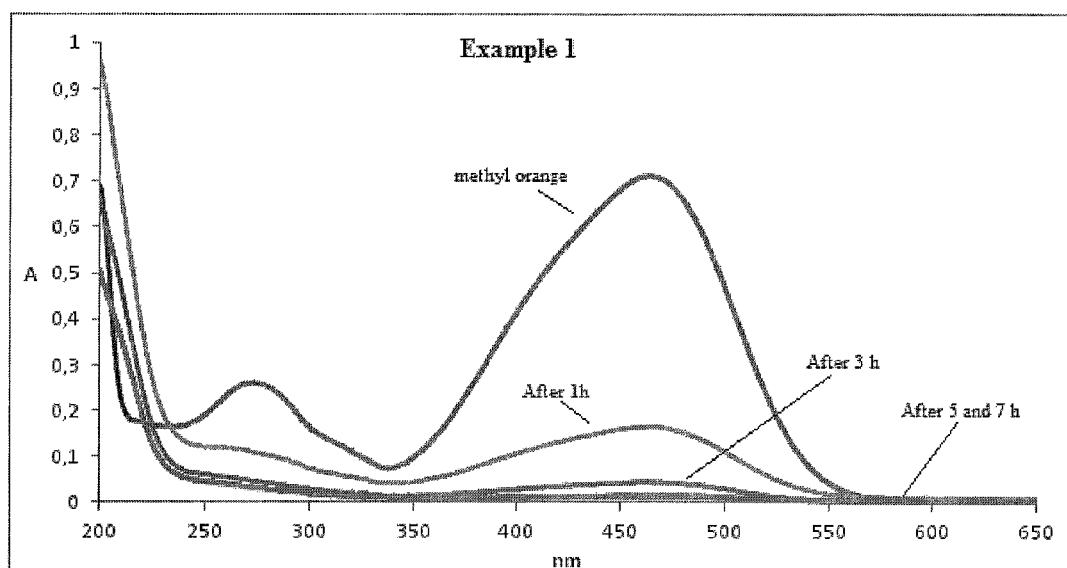
FIG. 8 shows UV spectra of carbon materials of example 1 and example 2 after absorption of methyl orange solution (10 ppm).

The absorption of methyl orange was evaluated. The absorption was evaluated by adding 50 mg of carbon materials of example 2 to a 5 ml of a solution of methyl orange (10 ppm) through the UV-Vis analysis (PerkinElmer lambda 15, λ=200-650 nm) of the concentration of methyl orange (peak at 464 nm) in time. The results are graphically shown in FIG. 8. As it is evident in FIG. 8, for the materials of the invention the absorption of methyl orange after 7 h was almost complete. Normalizing to 1 g of carbon material for simplicity added to 1 mg of methyl orange in 100 ml of water was able to absorb 0.79 mg of methyl orange after 1 h, 0.93 mg after 3 hours. All of methyl orange was absorbed after 7 hours.

The test was repeated with a water solution of doxorubicin to evaluate the absorption. 4 mg of carbon material obtained according to the example 2 were suspended in 2 mg/ml water solution of doxorubicin. The loading capacity was of 75.29%

Example 10: Absorption Feature of Gases

The evaluation of gases absorption was carried out through a microcalorimeter and the final measurements were carried out at a temperature of 30° C.

During the analysis the initial pressure (pi) and the external temperature (Ti) were measured. When the equilibrium was reached the equilibrium pressure (pe) and the equilibrium temperature (Te) were measured.

For each sample the absorbed amount (Na) was calculated through the gas equation (PV=nRT).

The obtained results were plotted: Na vs pe. Absorption isotherms of the absorbed amount per gram vs equilibrium pressure were obtained.

From this plot it was possible to evaluate the kind of absorption, thus evaluating whether it is either reversible or irreversible.

In order to understand if either a part or the total absorption is irreversible, after the first step of absorption (first absorption) a degassing step was carried out.

Subsequently, a second absorption step (second absorption) was carried out.

When the two obtained absorption isotherms are overlapped, then the process is totally reversible.

When the two obtained absorption isotherms are different, then the process is partially irreversible.

Example 10a: Absorption of Water with the Carbon Material of First Embodiment of the Invention The isotherms obtained for the carbon material of example 2 is represented in FIG. 9.

Figure 9:
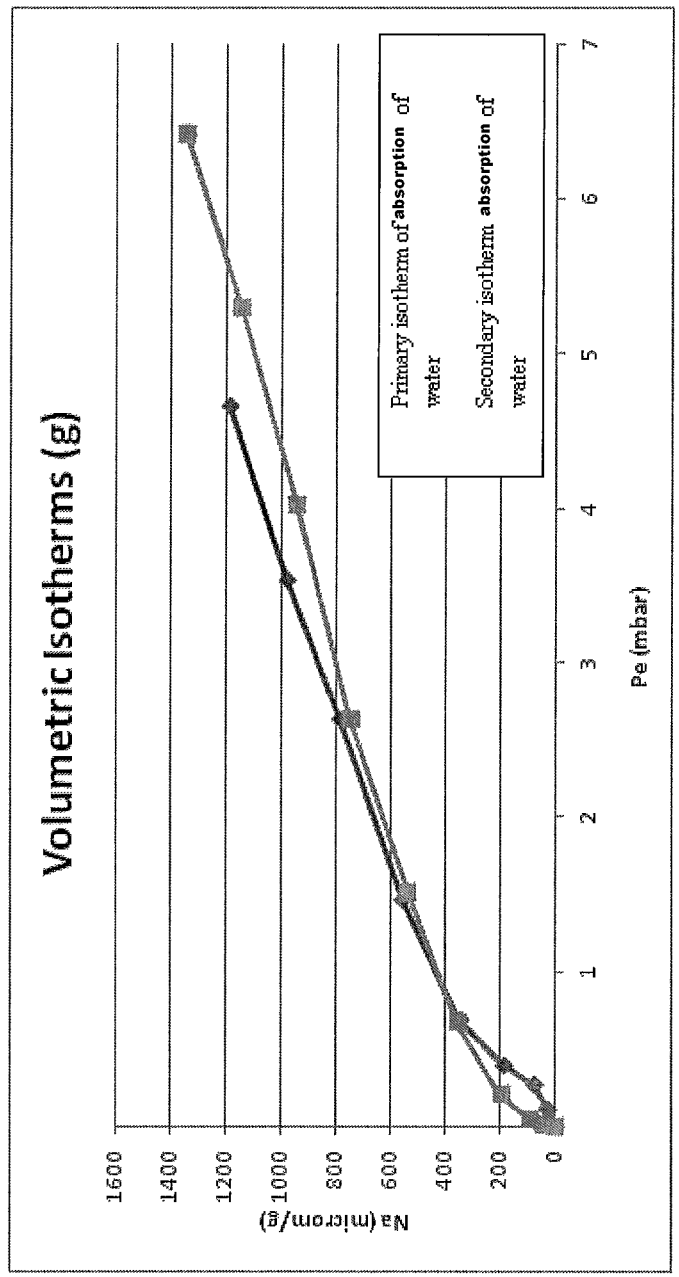
FIG. 9 shows isotherms of the absorption of water of the carbon material of example 2.

As it is evident from FIG. 9 the first isotherm and the second isotherm for the carbon material of example 2 were overlapped, hence the absorption of the water was reversible.

Example 10b: Absorption of $CO_2$ with the Carbon Material of First Embodiment of the Invention The isotherms obtained for the carbon material of example 1 are represented in FIG. 10.

Figure 10:
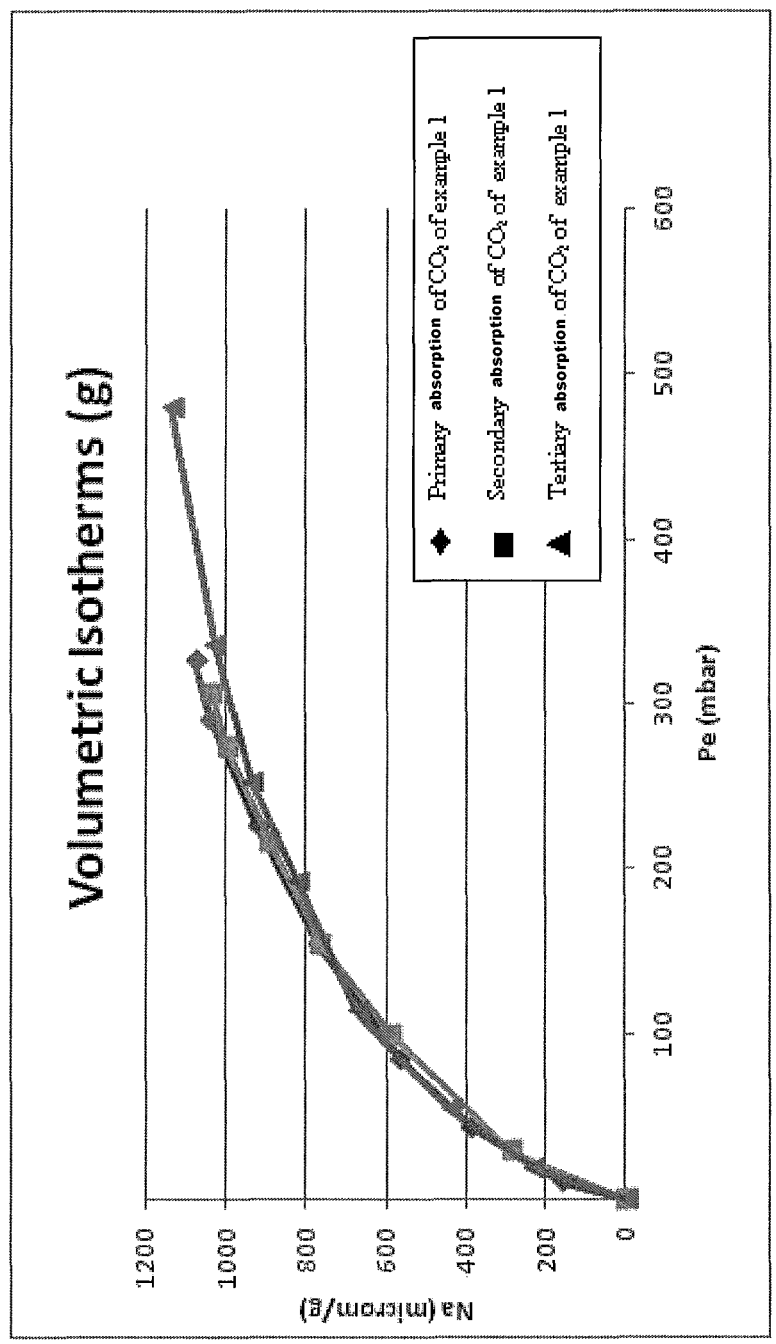
FIG. 10 shows isotherms of the absorption of $CO_2$ of the carbon material of example 1.

As it is evident from FIG. 10 the first isotherm, the second isotherm and the third isotherm for the carbon material of example 1 were not overlapped, hence the absorption of the $CO_2$ was irreversible.

The maximum absorption for the first absorption of $CO_2$ was 1287 µmol/$g_{sample}$ which correspond to 56.6 mg/$g_{sample}$ at a pressure of 461 mbar. According to the literature, the best active carbon is capable to absorb about 60 mg/g of $CO_2$ at atmospheric pressure or higher.

As to the maximum absorbed amount for the other two immissions of $CO_2$, the following were retrieved:

second absorption: 39.05 mg/$g_{sample}$ at pressure of 355 mbar.

third absorption: 39.39 mg/$g_{sample}$ at pressure of 401 mbar.

The test was repeated by using also nitrogen: the carbon material of the invention did not absorb the gas and it was not possible to draw the isotherm. Therefore the carbon materials of the invention absorbed selectively $CO_2$ and did not have interaction with $N_2$.

Example 10c: Absorption of $CO_2$ of the Carbon Material of the Second Embodiment of the Invention The isotherms obtained for the carbon material of example 2 are represented in FIG. 11.

Figure 11:
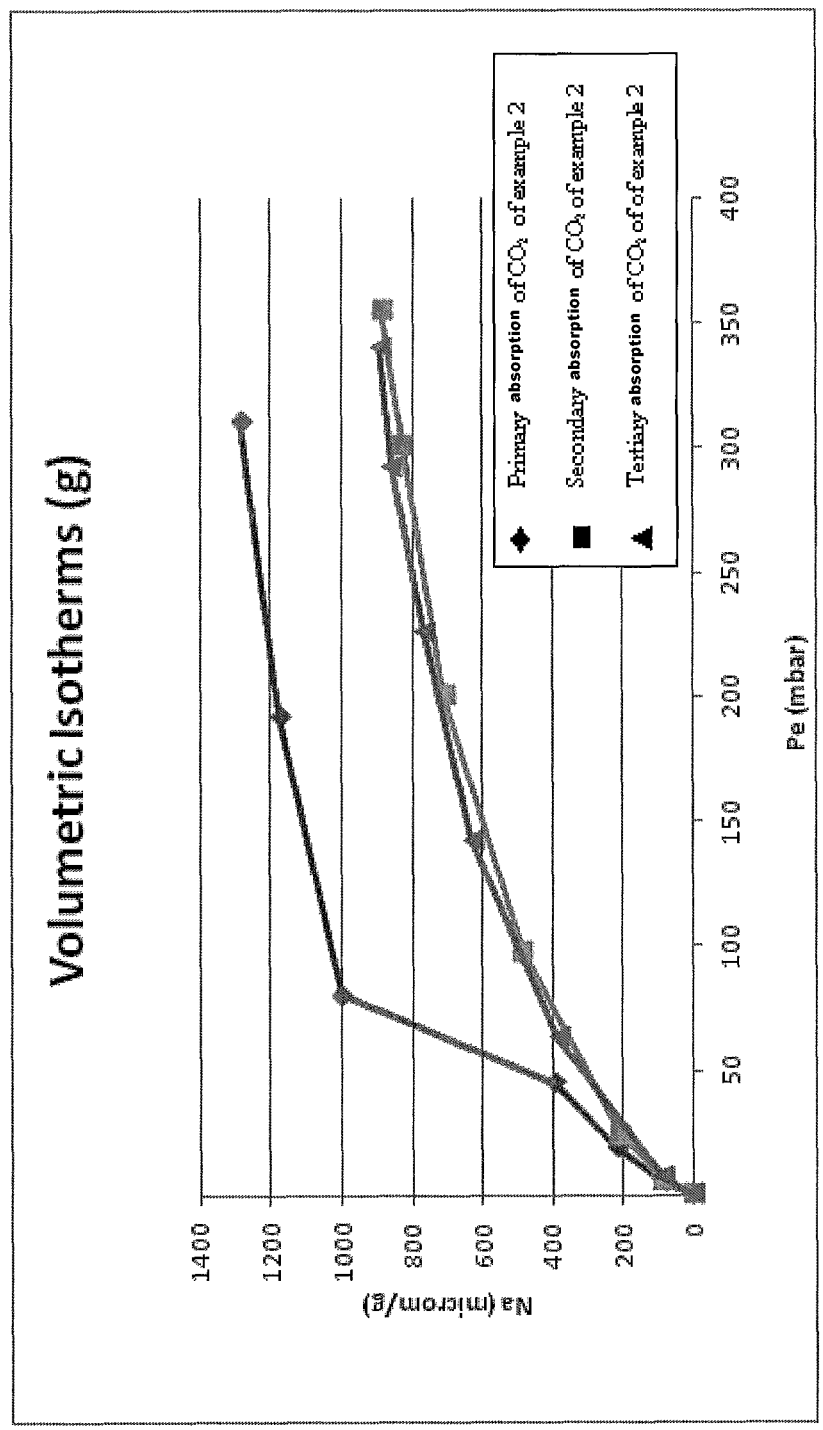
FIG. 11 shows isotherms of the absorption of $CO_2$ of the carbon material of example 2.

As it is evident from FIG. 11 the first isotherm, the second isotherm and the third isotherm for the carbon material of example 2 were overlapped, hence the absorption of the CO2 was reversible.

The maximum absorption for the first absorption of $CO_2$ was 45.23 mg/$g_{sample}$ at a pressure of 370 mbar.

As to the maximum absorbed amount for the other two immissions of $CO_2$, the following were retrieved:

second absorption: 45.45 mg/$g_{sample}$ at pressure of 345 mbar.

third absorption: 50.07 mg/$g_{sample}$ at pressure of 658 mbar.

Example 11: Stability of the Microporous Carbon Material of the Invention

The carbon materials obtained by the Example 1 and Example 2 were heated under nitrogen for TGA analysis.

Figure 12:
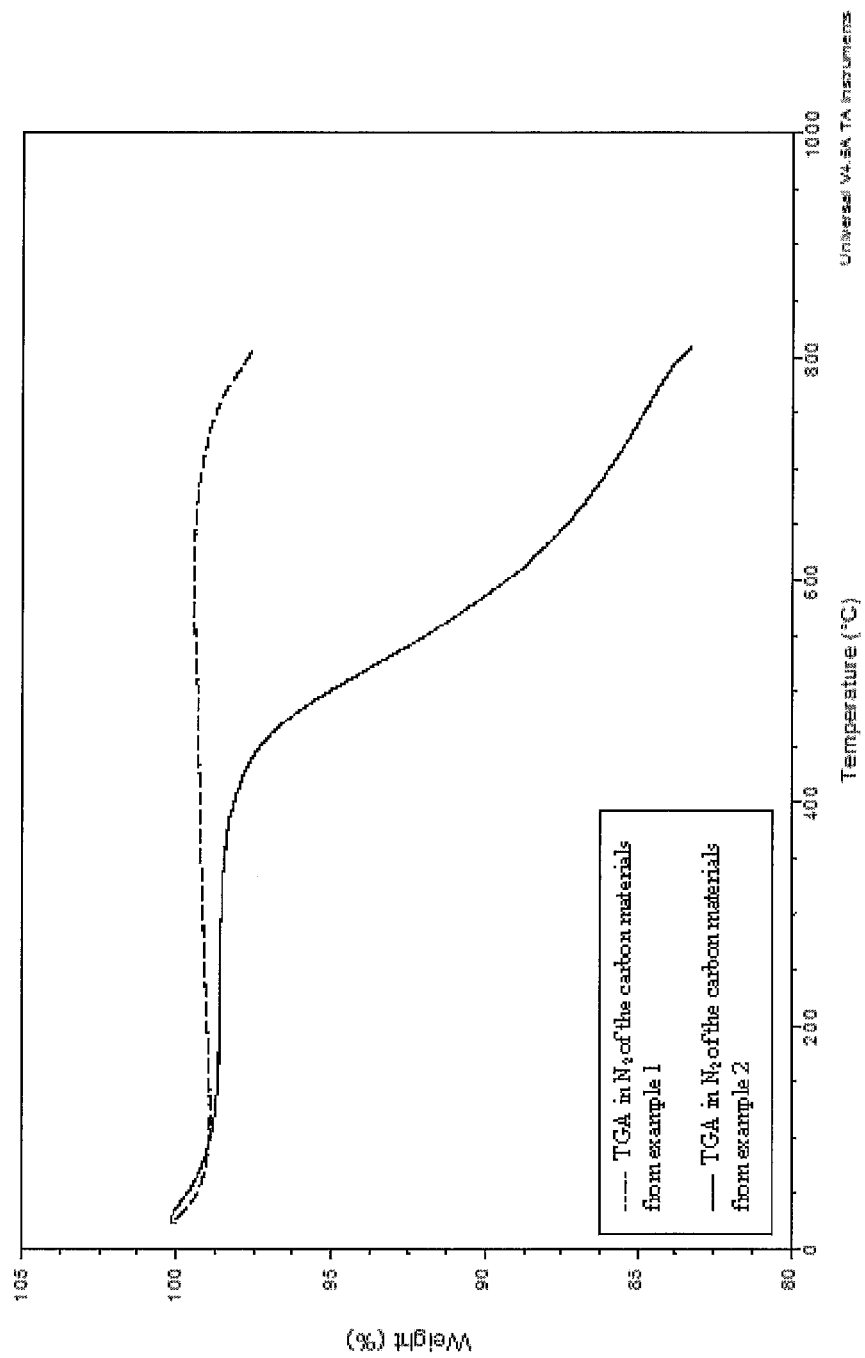
FIG. 12 show TGA graphs of the carbon materials of Example 1 and example 2.

The TGA for the both materials is reported in FIG. 12.

As it is seen from FIG. 12, the carbon material of Example 2 started the degradation at 650° C., while that of Example 1 at 400° C. The losses of weight for both materials were low: 2% for the carbon material of Example 2 and 13% for the carbon material of example 1.

Example 12: Stability of the Microporous Carbon Material of the Invention

The carbon materials obtained by the Example 3 and Example 4 were heated under nitrogen for TGA analysis.

Figure 13:
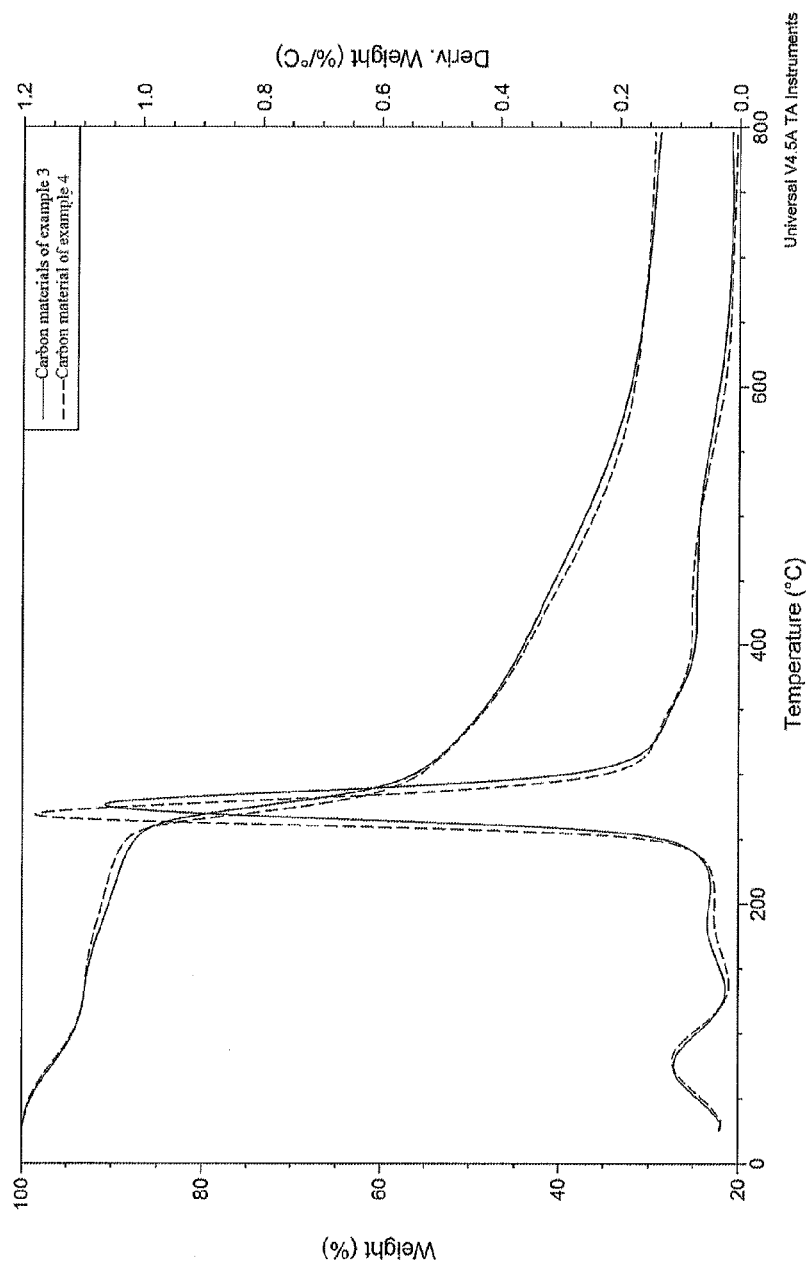
FIG. 13 show TGA graphs of the carbon materials of Example 3 and Example 4.

The TGA for the both materials is reported in FIG. 13.

As it is seen from FIG. 13, the carbon material of Example 3 started the degradation at 250° C., while that of Example 4 at 245° C. The losses of weight for both materials were low: 28% for the carbon material of Example 3 and 29% for the carbon material of example 4.

The invention claimed is:

1. A process for preparing a porous carbon material in which the porosity of said material consists only of pores having pore size distribution in the range from about 6 Å to about 16 Å, said method comprising the following steps:
   i) providing a cross-linked polymer selected from:
      A1) a cross-linked polymer of maltodextrin and an organic aromatic dianhydride, wherein said maltodextrin of the cross-linked polymer is from starch comprising amylose in the range from 25 to 50% expressed as dry weight relative to the dry weight of the starch, and wherein the mass ratio of maltodextrin to organic aromatic dianhydride is in the range of 1.0:0.50 to 1:2; or
      A2) a cross-linked polymer of cyclodextrin and an organic aromatic dianhydride, wherein the mass ratio of maltodextrin to organic aromatic dianhydride is in the range of 1.0:0.50 to 1:2;
   ii) pyrolyzing the provided cross-linked polymer at a range from 700 to 900° C. with a heating ramp in the range from 5° C./min to 30° C./min in an inert gas flux; and
   iii) cooling the residue obtained by said pyrolyzing, thereby preparing the porous carbon material in which the porosity of said material consists only of pores having pore size distribution in the range from about 6 Å to about 16 Å.

2. The process according to claim 1, wherein the organic aromatic dianhydride of step i) is selected from the group consisting of pyromellitic dianhydride, NTCDA (1,4,5,8-naphthalene-tetracarboxylic dianhydride), 3,3',4,4'-biphenyltetracarboxylic dianhydride, benzophenone-3,3',4,4'-tetracarboxylic dianhydride, 4,4'-(hexafluoroisopropylidene)diphthalic anhydride.

3. The process according to claim 2, wherein the organic aromatic dianhydride is pyromellitic dianhydride.

4. The process according to claim 1, wherein the cross-linked polymer comprises a ratio of either maltodextrin or cyclodextrin with respect to the organic aromatic dianhydride in the range of 1:0.60 to 1:1.

5. The process according to claim 1, wherein the cross-linked polymer is maltodextrin with the organic aromatic dianhydride in a mass ratio of 1:0.77.

6. The process according to claim 5 wherein the maltodextrin A1) is from leguminous starch.

7. The process according to claim 6, wherein the leguminous starch is from a plant chosen from the group formed by the pea, bean, broad bean, horse bean and their mixtures.

8. The process according to claim 6, wherein the leguminous starch has an amylose content from 30% to 40%, dry weight relative to the dry weight of starch.

9. The process according to claim 6, wherein the leguminous starch has an amylose content from 35% to 40% dry weight relative to the dry weight of starch.

10. The process according to claim 6, wherein the leguminous starch has an amylose content from 35% to 38% dry weight relative to the dry weight of starch.

11. The process according to claim 1, wherein the maltodextrin has a dextrose equivalent (DE) of 17.

12. The process according to claim 1, wherein the cyclodextrin is selected from the group consisting of α-cyclodextrin, β-cyclodextrin, γ-cyclodextrin and their derivatives.

13. The process according to claim 12, wherein the derivative of the cyclodextrin is methyl β-cyclodextrin or hydroxypropyl-β-cyclodextrin.

14. The process according to claim 1, wherein the cross-linked polymer is cyclodextrin with the organic aromatic dianhydride in a mass ratio of 1:0.67, wherein the cyclodextrin is γ-cyclodextrin.

15. The process according to claim 1, wherein the cross-linked polymer is cyclodextrin with the organic aromatic dianhydride in a mass ratio of 1:0.77, wherein the cyclodextrin is β-cyclodextrin.

16. The process according to claim 1, wherein the inert gas flux is a nitrogen flux, preferably of 100 ml/min.

17. The process according to claim 1, wherein the ramp temperature of the pyrolysis step ii) is 10° C./min.

18. The process according to claim 1, wherein the pyrolysis temperature is 800° C.

19. The process according to claim 1, wherein the cross-linked polymer is cyclodextrin with the organic aromatic dianhydride in a mass ratio of 1:0.90, wherein the cyclodextrin is α-cyclodextrin.

* * * * *